(12) United States Patent
Voges

(10) Patent No.: US 10,487,921 B2
(45) Date of Patent: Nov. 26, 2019

(54) ENGINE WITH INBOARD CAM DRIVE TENSIONER

(71) Applicant: Harley-Davidson Motor Company Group, LLC, Milwaukee, WI (US)

(72) Inventor: Johann Voges, Brookfield, WI (US)

(73) Assignee: Harley-Davidson Motor Company Group, LLC, Milwaukee, WI (US)

(*) Notice: Subject to any disclaimer, the term of this patent is extended or adjusted under 35 U.S.C. 154(b) by 379 days.

(21) Appl. No.: 15/386,886

(22) Filed: Dec. 21, 2016

(65) Prior Publication Data

US 2018/0172115 A1 Jun. 21, 2018

(51) Int. Cl.
| | |
|---|---|
| F16H 7/08 | (2006.01) |
| F16H 57/01 | (2012.01) |
| F16H 7/06 | (2006.01) |
| F01L 1/02 | (2006.01) |
| F01L 1/053 | (2006.01) |
| F02F 1/24 | (2006.01) |

(Continued)

(52) U.S. Cl.
CPC ............... *F16H 7/08* (2013.01); *F01L 1/02* (2013.01); *F01L 1/022* (2013.01); *F01L 1/047* (2013.01); *F01L 1/053* (2013.01); *F01M 9/10* (2013.01); *F01M 11/02* (2013.01); *F02F 1/24* (2013.01); *F16H 7/06* (2013.01); *F16H 57/01* (2013.01); *F01L 2001/0476* (2013.01); *F01L 2001/0537* (2013.01); *F16H 2007/0812* (2013.01); *F16H 2007/0872* (2013.01); *F16H 2007/0874* (2013.01); *F16H 2007/0893* (2013.01); *F16H 2007/0897* (2013.01)

(58) Field of Classification Search
CPC ..... F16H 2007/0806; F16H 2007/0812; F16H 2007/0859; F16H 7/0848; F16H 2007/0853
USPC .................................................. 474/110, 111
See application file for complete search history.

(56) References Cited

U.S. PATENT DOCUMENTS 1,848,423 A * 3/1932 Jackson ................. D01H 1/241
  474/134
3,069,920 A * 12/1962 Cole ......................... F16H 7/08
  474/111

(Continued)

FOREIGN PATENT DOCUMENTS

| EP | 0902170 | 3/1999 |
| EP | 1321631 | 6/2003 |

*Primary Examiner* — Henry Y Liu
(74) *Attorney, Agent, or Firm* — Michael Best & Friedrich LLP

(57) ABSTRACT

An overhead-cam internal combustion engine includes a crankshaft, a drive wheel rotatable by the crankshaft, a cylinder head, a driven wheel rotatable by the drive wheel, and a camshaft provided within the cylinder head, the camshaft being rotatable by the driven wheel. A flexible drive member extends around the drive wheel and the driven wheel such that power from the crankshaft for rotating the camshaft is transmitted through the flexible drive member. A pair of guide members are positioned to guide a path of the flexible drive member that increases an amount of peripheral wrap of the flexible drive member about the driven wheel. The guide members have co-facing inboard guide surfaces that partially define the path. A tensioner is positioned between the co-facing inboard guide surfaces, and the tensioner is operable to exert a pulling force that increases tension in the flexible drive member during operation.

8 Claims, 5 Drawing Sheets

(51) Int. Cl.
*F01M 11/02* (2006.01)
*F01M 9/10* (2006.01)
*F01L 1/047* (2006.01)

(56) References Cited

U.S. PATENT DOCUMENTS

| | | | | |
|---|---|---|---|---|
| 4,193,314 | A | 3/1980 | Horner et al. | |
| 4,869,708 | A * | 9/1989 | Hoffmann | F01L 1/02 474/140 |
| 5,117,786 | A * | 6/1992 | Trzmiel | F16H 7/0836 123/90.31 |
| 5,197,420 | A * | 3/1993 | Arnold | F01L 1/348 123/90.15 |
| 5,246,404 | A * | 9/1993 | Ojima | F16H 7/08 474/111 |
| 5,797,817 | A * | 8/1998 | Senftleben | F01L 1/02 474/110 |
| 6,093,123 | A * | 7/2000 | Baddaria | F01L 1/02 474/110 |
| 6,106,423 | A * | 8/2000 | White | F16H 7/08 474/109 |
| 6,129,644 | A * | 10/2000 | Inoue | F16H 7/0836 474/101 |
| 6,322,469 | B1 * | 11/2001 | Markley | F16H 7/1236 474/110 |
| 6,322,470 | B1 * | 11/2001 | Markley | F16H 7/08 474/111 |
| 6,358,169 | B1 * | 3/2002 | Markley | F02B 67/06 474/111 |
| 6,375,587 | B1 * | 4/2002 | Wigsten | F16H 7/08 474/109 |
| 6,412,464 | B1 * | 7/2002 | Schneider | F01L 1/02 123/90.15 |
| 6,482,116 | B1 * | 11/2002 | Ullein | F16H 7/08 474/101 |
| 6,599,209 | B1 * | 7/2003 | Ullein | F16H 7/08 474/111 |
| 6,701,884 | B2 | 3/2004 | Schneider et al. | |
| 7,429,226 | B2 * | 9/2008 | Tryphonos | F01L 1/024 474/109 |
| 7,476,168 | B2 * | 1/2009 | Markley | F16H 7/0829 474/111 |
| 7,513,844 | B2 * | 4/2009 | Matsushita | F16H 7/0836 474/109 |
| 7,628,719 | B2 * | 12/2009 | Markley | F16H 7/0848 474/111 |
| 7,632,200 | B2 * | 12/2009 | Markley | F16H 7/0848 474/109 |
| 7,686,718 | B2 * | 3/2010 | Nakano | F01L 1/022 123/90.31 |
| 8,052,558 | B2 * | 11/2011 | Markley | F16H 7/0848 474/111 |
| 8,066,600 | B2 * | 11/2011 | Wigsten | F16H 7/0848 474/111 |
| 8,454,462 | B2 * | 6/2013 | Konno | F16H 7/08 474/111 |
| 8,465,385 | B2 * | 6/2013 | Konno | F16H 7/08 474/101 |
| 8,523,720 | B2 * | 9/2013 | Reinhart | F16H 7/0848 29/525.01 |
| 8,550,943 | B2 * | 10/2013 | Kroon | F01L 1/02 474/111 |
| 8,579,746 | B2 * | 11/2013 | Mori | F16H 7/06 474/140 |
| 8,608,601 | B2 * | 12/2013 | Kim | F16H 7/08 474/101 |
| 8,672,785 | B2 * | 3/2014 | Young | F16H 7/08 474/111 |
| 8,979,684 | B2 * | 3/2015 | Markley | F16H 7/0831 474/111 |
| 9,651,121 | B2 * | 5/2017 | Kurematsu | F16H 7/18 |
| 2006/0270502 | A1 * | 11/2006 | Markley | F16H 7/08 474/111 |
| 2007/0066428 | A1 * | 3/2007 | Tryphonos | F01L 1/024 474/111 |
| 2007/0082773 | A1 * | 4/2007 | Yamada | F16H 7/0848 474/109 |
| 2007/0093328 | A1 * | 4/2007 | Markley | F16H 7/0848 474/111 |
| 2009/0188465 | A1 * | 7/2009 | Iwata | F02F 7/0073 123/195 C |
| 2009/0325750 | A1 * | 12/2009 | Wigsten | F16H 7/0831 474/111 |
| 2011/0015014 | A1 * | 1/2011 | Kroon | F16H 7/08 474/110 |
| 2011/0077114 | A1 * | 3/2011 | Markley | F01L 1/02 474/111 |
| 2013/0133611 | A1 * | 5/2013 | Koiwa | F02B 77/00 123/195 C |
| 2015/0345596 | A1 * | 12/2015 | Lindner | F01L 1/022 474/111 |

* cited by examiner

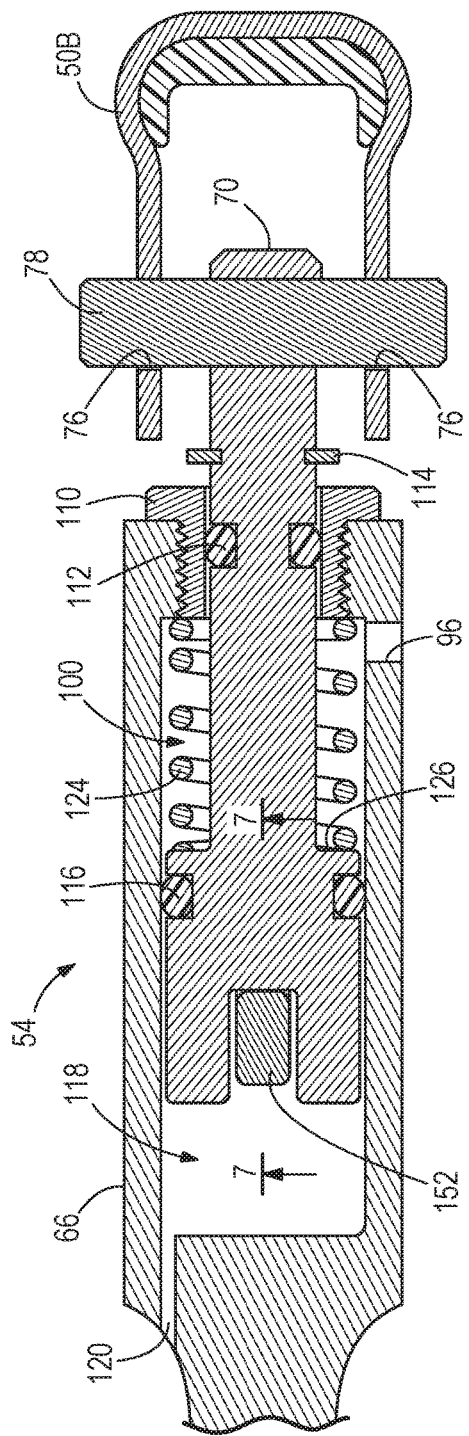
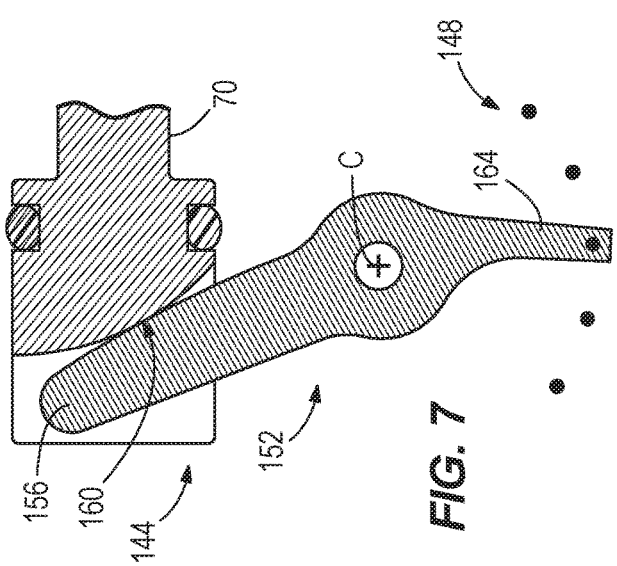
FIG. 6
FIG. 7

ENGINE WITH INBOARD CAM DRIVE TENSIONER

BACKGROUND

The present disclosure relates to internal combustion engines, and more particularly, to tensioners for timing chains and the like that drive one or more camshafts from an engine crankshaft.

SUMMARY

In one aspect, the invention provides an overhead-cam internal combustion engine including a crankshaft, a drive wheel rotatable by the crankshaft, a cylinder head, a driven wheel rotatable by the drive wheel, and a camshaft provided within the cylinder head, the camshaft being rotatable by the driven wheel. A flexible drive member extends around the drive wheel and the driven wheel such that power from the crankshaft for rotating the camshaft is transmitted through the flexible drive member. A pair of guide members is positioned to guide a path of the flexible drive member that increases an amount of peripheral wrap of the flexible drive member about the driven wheel. The guide members have co-facing inboard guide surfaces that partially define the path. A tensioner is positioned between the co-facing inboard guide surfaces, and the tensioner is operable to exert a pulling force that increases tension in the flexible drive member during operation.

In another aspect, the invention provides an overhead-cam engine cylinder head including at least one camshaft support defining an axial direction. An axial end face of the cylinder head includes both a threaded mounting hole and an oil supply port. A hydraulic tensioner has an oil inlet port coupled to the oil supply port. The hydraulic tensioner is secured to the axial end face with a threaded fastener engaged with the threaded mounting hole. The hydraulic tensioner includes a rod variably extensible from a body of the hydraulic tensioner, and the rod is urged into the body when supplied with oil from the oil supply port.

Other aspects of the disclosure will become apparent by consideration of the detailed description and accompanying drawings.

BRIEF DESCRIPTION OF THE DRAWINGS

FIG. 6 is a cross-section view of the tensioner, taken along line 6-6 of FIG. 5.

FIG. 7 is a cross-section view taken along line 7-7 of FIG. 6 and illustrating a wear indicator coupled to a rod of the tensioner.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
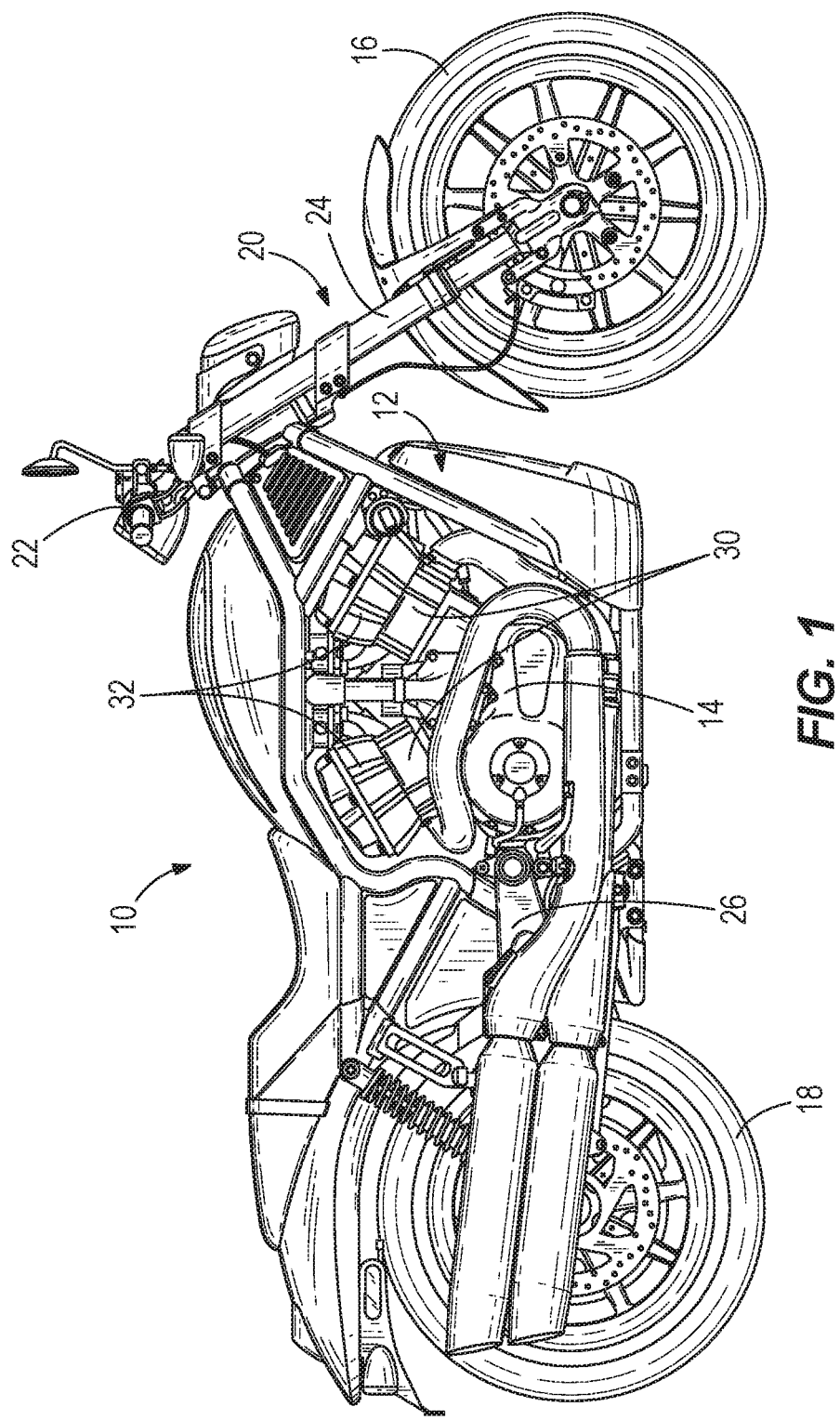
FIG. 1 is a side view of a motorcycle including an internal combustion engine.

FIG. 1 illustrates a motorcycle 10 that includes a frame 12, an engine 14, a front wheel 16, and at least one rear wheel 18 positioned rearward of the front wheel 16. The engine 14 is an internal combustion engine of the overhead cam type, and although a variety of alternate configurations may be suitable, the illustrated configuration is a V-twin having two cylinders 30 angled with respect to each other. A cylinder head 32 is positioned on top of each of the cylinders 30. The front wheel 16 is supported by a steering unit 20 including a handlebar 22 and a front fork 24. The rear wheel 18 is supported pivotably relative to the frame 12 by a swing arm 26.

Inside the engine 14, a crankshaft 36 (FIG. 2) is coupled to pistons that reciprocate in the respective cylinders 30 during operation. In order to open the intake and exhaust valves (not shown) inside the cylinder heads 32, each cylinder head 32 includes at least one camshaft 38. As shown in FIGS. 2-5, each cylinder head 32 has a dual overhead camshaft configuration, but a single overhead camshaft configuration can be provided in other constructions. A drive wheel 42 is provided on the crankshaft 36, and a driven wheel 44 is provided on each camshaft 38. A flexible drive member 48 wraps around the drive wheel 42 and the driven wheels 44 to transmit a drive force directly from the crankshaft 36 to the camshafts 38 and ensure that the camshafts 38 stay in time with the crankshaft 36 throughout the engine cycle. The flexible drive member 48 can be a timing chain or a timing belt, for example. Thus, it follows that the drive wheel 42 and the driven wheels 44 can be toothed wheels or pulleys. When the cylinders 30 are arranged separately, such as in the V-twin configuration, separate flexible drive members 48 are provided for the driven wheels 44 associated with each separate cylinder 30. The separate flexible drive members 48 can be driven from a single drive wheel 42 having multiple axially-adjacent drive portions, or can be driven from separate drive wheels on the crankshaft 36. The illustrated construction demonstrates a direct drive arrangement between the crankshaft 36 and the camshafts 38 (i.e., with nothing in between except for the flexible drive member 48) since the drive wheel 42 is provided directly on the crankshaft 36 and the driven wheels 44 are provided directly on the camshafts 38. However, an indirect drive arrangement can be provided in other constructions. For example, the drive wheel 42 can be a toothed gear or pulley on an intermediate shaft, or "jack shaft", separate from the crankshaft 36. It is also possible in some constructions for one or more of the driven wheels 44 to be idler wheels, separate from the respective camshafts 38 such that the drive wheel 42 drives the driven wheel 44 with the flexible drive member 48, and the driven wheel 44 in turn drives the respective camshaft(s) 38 via an additional transmission element, such as a set of toothed gears.

Figure 2:
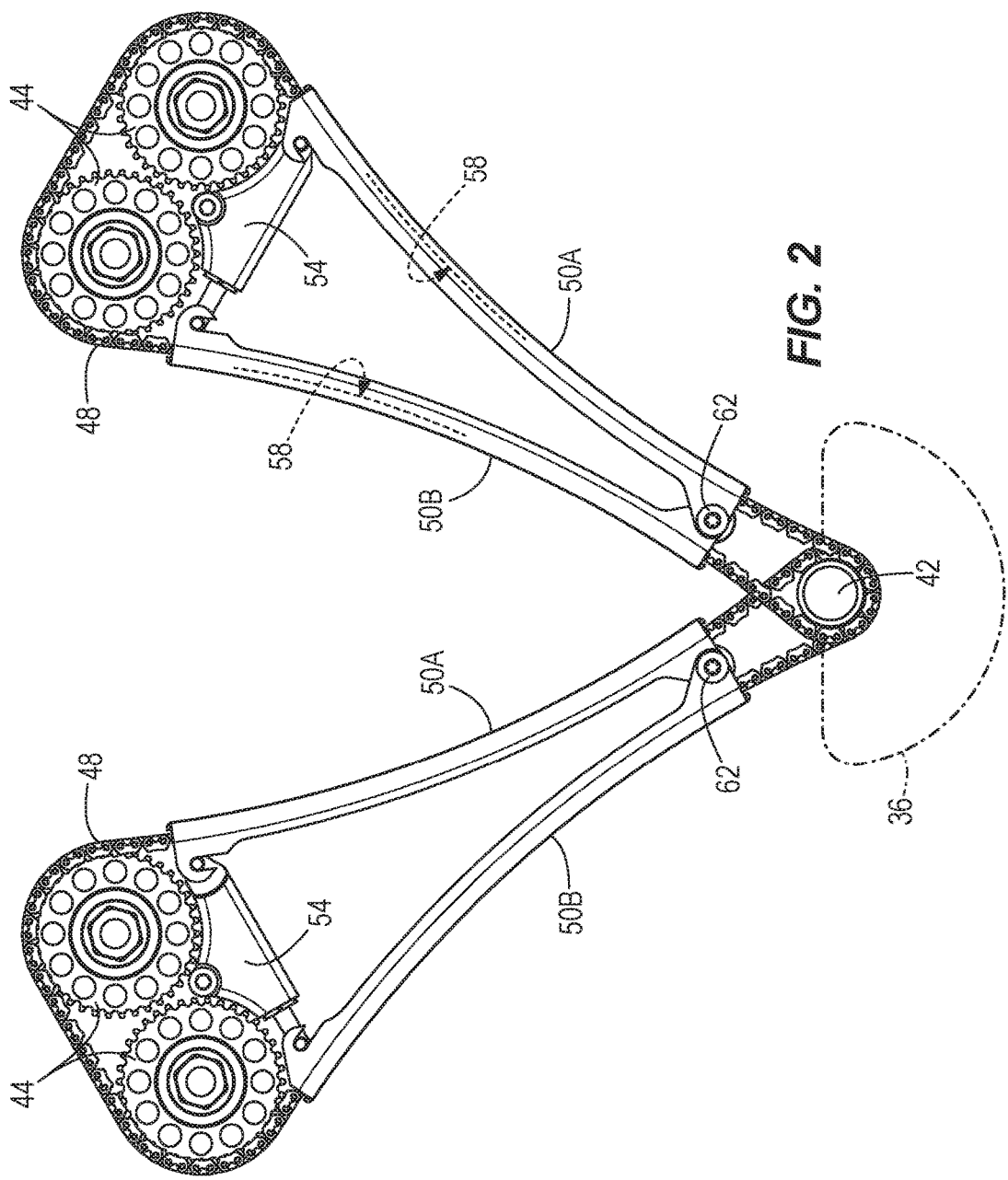
FIG. 2 is a side view of a timing assembly of the engine of FIG. 1 for driving overhead camshafts of each cylinder from a crankshaft.

The drive wheel 42 drives the driven wheels 44 (e.g., all rotate clockwise as shown in FIG. 2) such that one length of the flexible drive member 48 between the drive wheel 42 and one of the driven wheels 44 is pulled in tension and the opposite length of the flexible drive member 48 is potentially slack since the drive force from the drive wheel 42 attempts to "push" the flexible drive member 48. A pair of guide members 50A, 50B and a tensioner 54 are provided for each flexible drive member 48 to guide the path and to apply pressure on the side of the flexible drive member 48 that is otherwise prone to slack. Although the illustrated V-twin engine 14 includes two such flexible drive members 48 and two tensioners 54, the arrangement for the second cylinder 30 is a duplicate of the arrangement for the first cylinder 30, and the following description focuses on disclosing the features of just one of these.

The guide members 50A, 50B are shaped and positioned with respect to the drive wheel 42 and the driven wheels 44 so as to increase an amount of peripheral wrap of the flexible drive member 48 about the driven wheels 44. For example, each of the guide members 50A, 50B has a convex inboard guide surface 58 such that the two inboard guide surfaces 58 are in co-facing relationship with each other. The inboard guide surfaces 58 are convex so that the two sides of the flexible drive member 48 are guided closer to each other than if the flexible member 48 was simply extended tangent with the drive wheel 42 and the respective driven wheel 44. A first one of the guide members 50A is a fixed guide member that is secured in a fixed position and orientation with respect to the engine 14. Thus, the first guide member 50A defines a fixed path portion. The second guide member 50B is a movable or adjustable guide member that is supported for movement with respect to the engine 14. Thus, the second guide member 50B defines an adjustable path portion. For example, the second guide member 50B can be pivotally supported at a bottom end thereof, adjacent the crankshaft 36. A pivot axis of the second guide member 50B can be defined by a fastener 62, and in some constructions the fastener 62 can support the respective bottom ends of both the first and second guide members 50A, 50B. In other constructions, separate fasteners can be provided for the first and second guide members 50A, 50B. Further, either or both guide members 50A, 50B can be supported at a position above the bottom end. Depending on the material selected for the guide members 50A, 50B, the inboard guide surfaces 58 can be constructed as a separate layer of a low-friction, wear-resistant material.

The tensioner 54 is positioned between the co-facing inboard guide surfaces 58, and is operable to exert a pulling force that increases tension in the flexible drive member 48 during operation. In particular, the tensioner 54 is not only between the inboard guide surfaces 58 in the side view of FIG. 2, but can be positioned directly between the co-facing inboard guide surfaces 58 as more readily appreciated from FIG. 3. Furthermore, the tensioner 54 can be positioned entirely between the co-facing inboard guide surfaces 58 such that no portion of the tensioner 54 extends outwardly thereof. As discussed in further detail below, the tensioner 54 is operable to pull the second guide member 50B toward the first guide member 50A, and the tensioner 54 does not tension the flexible drive member 48 by exerting a pushing force. This arrangement not only provides economical packaging, but furthermore, prevents any external protuberance from the cylinder 30 or the cylinder head 32, which can be unsightly and pose the risk for leaking when penetrating an exterior thereof. As discussed below, the tensioner 54 is positioned adjacent the upper ends (i.e., the camshaft ends) of the first and second guide members 50A, 50B, but the tensioner 54 can be positioned further toward the crankshaft, or bottom end, in other constructions.

Figure 3:
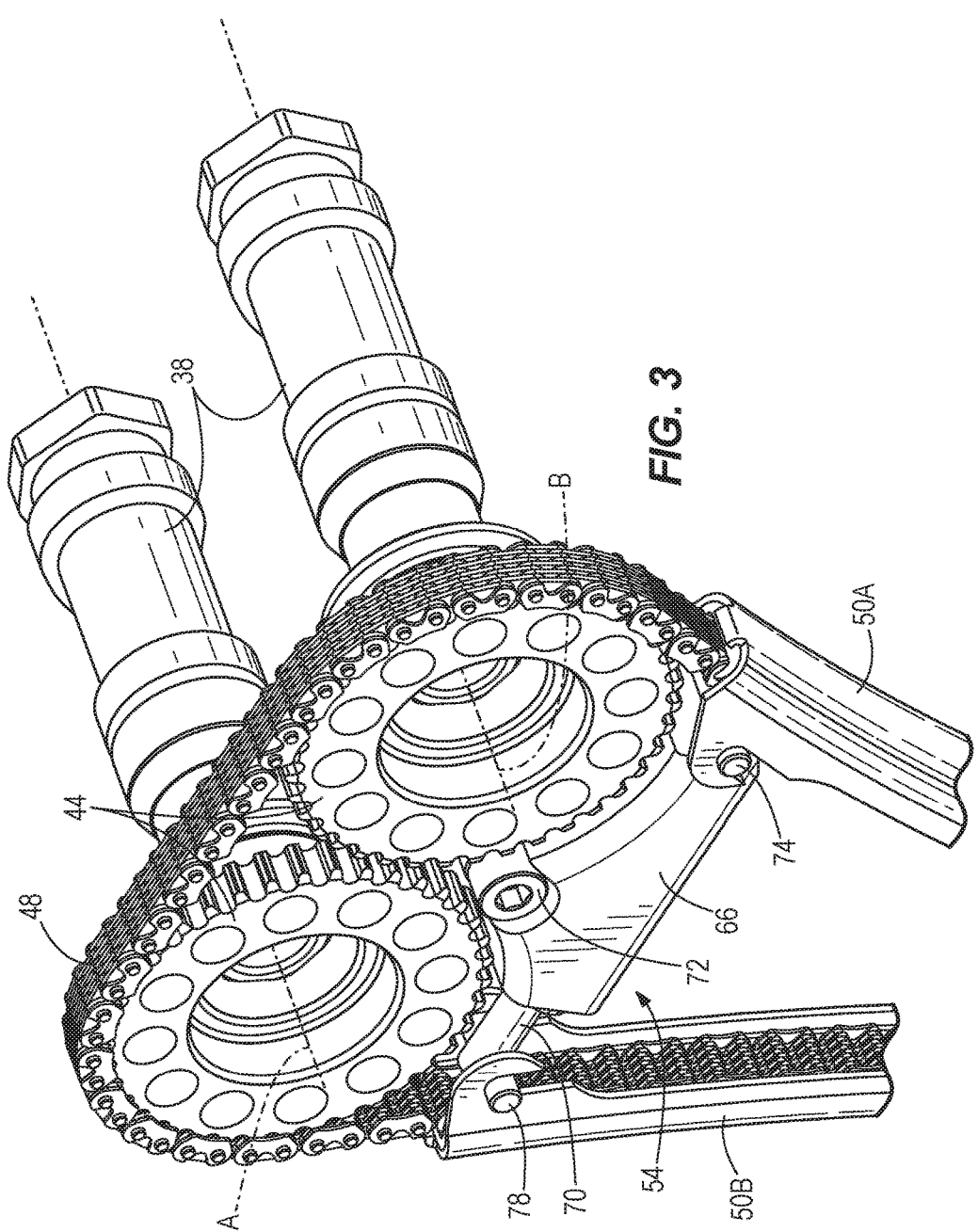
FIG. 3 is a perspective view of an upper end portion of the timing assembly of FIG. 2 associated with one of the engine cylinders.

The tensioner 54 includes a body 66 and a rod 70 movable within the body 66, for example, to reciprocate therein. As discussed in further detail below, the tensioner 54 is a hydraulic tensioner that operates to apply tension when supplied with pressurized fluid (e.g., oil). However, the tensioner 54 may provide tension by other mechanisms in other constructions. For example, the tensioner 54 can be purely mechanical and may include a mechanism including a spring and ratchet operable to pull the second guide member 50B toward the first guide member 50A. The body 66 is secured to the cylinder head 32 by a fastener 72, for example a screw or other threaded fastener, located approximately midway between opposing ends of the tensioner 54. In the illustrated construction where the engine 14 is a dual overhead cam engine featuring two driven wheels 44 for each cylinder 30, at least a portion of the tensioner 54 is positioned in a space defined between the two driven wheels 44 as best shown in FIGS. 2 and 3. The position of the tensioner 54 can be directly adjacent the camshafts 38, and as far as possible from the crankshaft 36, although other positions may be optional. At one end, the body 66 is secured to the first guide member 50A, for example at an uppermost end of the first guide member 50A by a fastener 74 such that the position of the body 66 is fixed. The same fastener 74, which can be a dowel pin or other type of fastener, may be further secured to the cylinder head 32, thus fixing both the body 66 and the first guide member 50A. At the opposite end of the tensioner 54, a distal end of the rod 70 is coupled with the second guide member 50B with a rotatable joint. The rotatable joint can be provided by one or more slots or recesses 76 formed in the second guide member 50B (e.g., at an uppermost end of the second guide member 50B), and a pin 78 extending transversely to the rod 70 and secured thereto. The pin 78 is received within the recesses 76 to couple the rod 70 with the second guide member 50B to allow transmission of a pulling force without binding, as the second guide member 50B is supported to rotate about its bottom end at the fastener 62. Optionally, a wear resistant coating can be provided at the rotatable joint between the pin 78 and the recesses 76.

Figure 4:
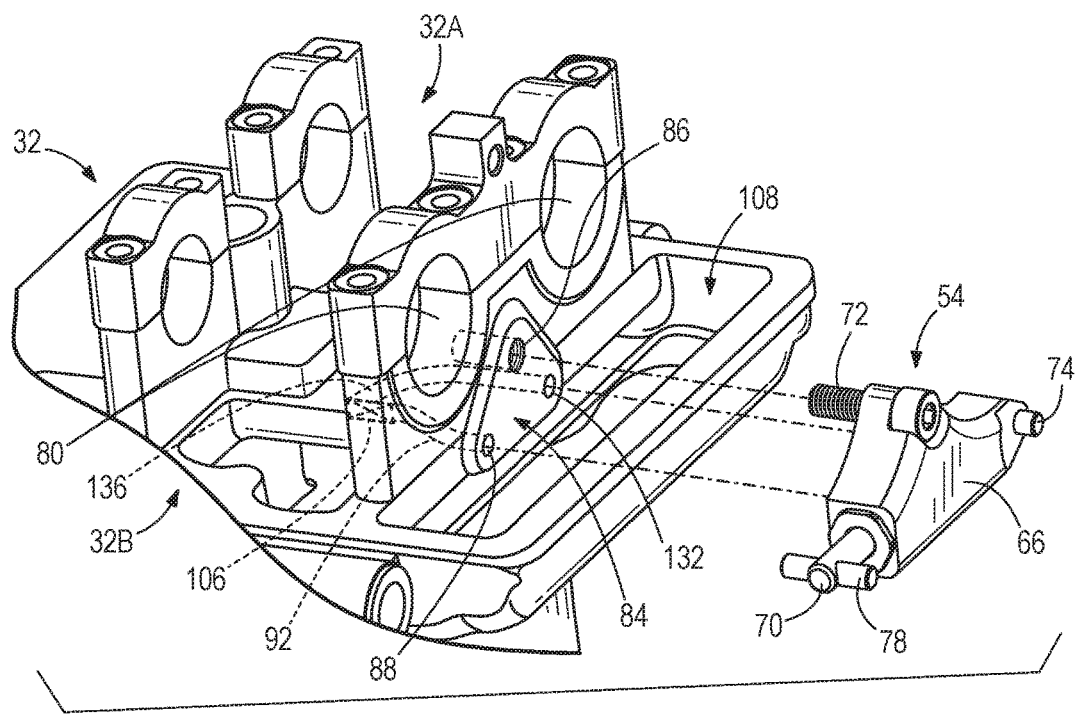
FIG. 4 is an exploded assembly view illustrating a tensioner of the timing assembly removed from its place in the cylinder head.
Figure 5:
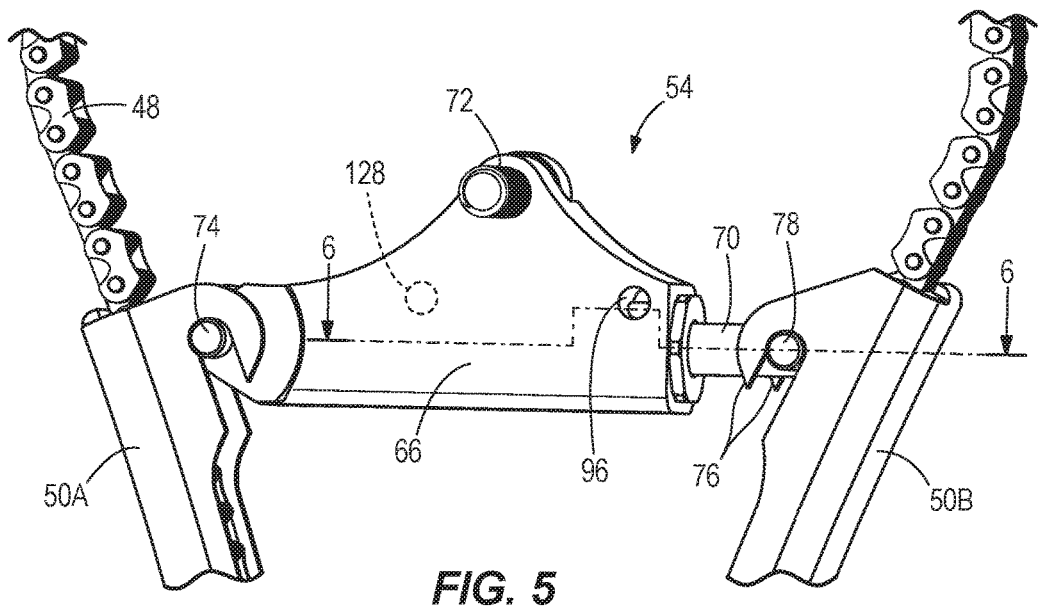
FIG. 5 is a perspective view illustrating an inboard side of the tensioner having oil ports.

Referring to FIGS. 4 and 5, the body 66 of the tensioner 54 is secured to a central portion of the cylinder head 32, between an intake side 32A and an exhaust side 32B of the cylinder head 32. Thus, the tensioner 54 forms part of the assembled cylinder head 32. In the illustrated dual overhead camshaft configuration, the cylinder head 32 includes two camshaft supports 80 for supporting the two camshafts 38 about two parallel axes A, B (FIG. 3), thus defining an axial direction. One of the camshafts 38 is an intake camshaft for operating intake valves on the intake side 32A, and one of the camshafts 38 is an exhaust camshaft for operating exhaust valves on the exhaust side 32B. Each camshaft support 80 can be a cylindrical journal bearing support formed by a base and a cap. An axial end face 84 of the camshaft support 80 is provided with features for interfacing with the tensioner 54. The axial end face 84 includes both a threaded mounting hole 86 for receiving the fastener 72 to mount the body 66, and the axial end face 84 further includes an oil supply port 88. Both the threaded mounting hole 86 and the oil supply port 88 are provided between the two camshaft supports 80. A main oil feed supply gallery or conduit 92 of the cylinder head 32 can extend directly to the oil supply port 88. The main oil feed supply gallery 92 can supply a plurality of engine components or interfaces with pumped oil for lubrication. As shown in FIGS. 5 and 6, the body 66 of the tensioner 54 includes an oil inlet port 96 that mates directly with the oil supply port 88 when the tensioner 54 is mounted to the cylinder head 32 with the fastener 72. This ensures that the tensioner 54, particularly a first chamber 100 therein, is supplied with pressurized oil continuously throughout engine operation.

As shown in FIG. 4, the tensioner 54 is arranged in a chamber 108, or chain case, formed at least partially by a plurality of walls of the cylinder head 32. The chamber 108 encloses the flexible drive member 48, the tensioner 54, and the pair of guide members 50A, 50B, wrapping around them on at least four sides. The tensioner 54 does not penetrate any of the plurality of walls forming the chamber 108. In fact, because the tensioner 54 is supported internally on the axial end face 84 of the camshaft support 80, the tensioner 54 does not extend to or beyond any external surface of the engine 14 and is entirely contained therein. As such, the placement of the tensioner 54 within the cylinder head 32 does not have the potential whatsoever to give rise to an external oil leak of the engine 14.

Looking further to the construction of the tensioner 54, reference is made to FIG. 6. At an opening in the body 66 where the rod 70 penetrates, the tensioner 54 is provided with a bushing 110 that forms a sliding seal with an exterior surface of the rod 70, or for example as shown, an O-ring 112 provided on the rod 70. The bushing 110 can be threaded into the body 66. Outward of the bushing 110, a stopper 114 may be fixed to the rod 70 to limit the maximum pull of the rod 70 with respect to the body 66, since the stopper 114 abuts and cannot pass through the bushing 110. The proximal portion of the rod 70 slides within the body 66 such that the first chamber 100 is defined as a variable volume oil chamber, delimited between the O-ring 112 at the bushing 110 and an O-ring 116 provided on the rod 70, that increases in volume to pull the rod 70 inward with increasing oil pressure. A second chamber 118 within the body 66, separated from the first chamber 100 by the O-ring 116, may be vented to local atmosphere by an aperture 120. The second chamber 118 can decrease in volume with an increase in the volume of the first chamber 100. A spring 124 may be compressed against a shoulder 126 of the rod 70 within the body 66 so that the tensioner 54 provides a positive minimum amount of pulling force, or pre-load, on the second guide member 50B. Oil pressure in the first chamber 100 adds to the preload provided by the spring 124. The rod 70 and the O-ring 116 form a hydraulically-actuated piston within the tensioner 54. Although this design is compact and efficient, other constructions may provide the tensioner 54 with an oil pressure actuated diaphragm. Especially at lower oil pressures, such a diaphragm can provide high sensitivity and minimal hysteresis.

In some constructions, the tensioner 54 forms part of a closed loop oil path. By this, it is meant that pressure-controlled oil can be supplied to both sides of the rod 70 instead of having the second chamber 118 vented to atmosphere. In such constructions, the optional second oil inlet port 128 shown in FIG. 5 is provided in the body 66. The oil inlet port 128 is coupled directly to a second oil supply port 132 formed at the end of a second main oil feed supply gallery or conduit 136 of the cylinder head 32. Establishing a closed loop oil path enables the pressure of the oil supplied to the tensioner 54 to be further controlled or manipulated by a control valve 106. Such a control valve 106 may be positioned inside the cylinder head 32 as shown, or directly within the tensioner 54, or even on the outside of the engine 14. The control valve 106 can act as a pressure regulator controlling the pressure of fluid inside the tensioner 54. The control valve 106 may be manipulated (e.g., by electronic or hydraulic control) to reduce pressure in the first chamber 100 to reduce the pulling force exerted on the second guide member 50B in a higher engine RPM range to reduce drag on the engine 14, which can otherwise become detrimental to engine performance. In constructions where the second chamber 118 is simply vented, the body 66 of the tensioner 54 can be provided without the second oil inlet port 128 and can plug the second oil supply port 132 when mounted to the cylinder head 32.

As shown in FIGS. 6 and 7, the tensioner 54 can additionally provide a wear meter 144 operable to provide a visual indication of the condition of the flexible drive member 48. In the illustrated construction, the wear meter 144 includes a scale 148 fixed relative to the tensioner body 66 and the cylinder head 32, and further includes a movable indicator 152 coupled to the rod 70 of the tensioner 54. The movable indicator member 152 can have a cam follower portion 156 engaged with a cam surface 160 provided at the proximal end of the rod 70. As such, movement of the rod 70 effects movement (e.g., rotation about a pivot axis C) of the indicator member 152, which can include an indicator or pointer portion 164. The pointer portion 164 can be opposite the cam follower portion 156 with respect to the pivot axis C. Movement of the indicator member 152 causes the pointer portion 164 to traverse across the scale 148. The scale 148 is designed with markings corresponding to an available stroke range of the tensioner 54 to visually indicate the condition of the flexible drive member 48. The stroke range of the tensioner 54 corresponds to the condition of the flexible drive member 48 because a stretching out of the flexible drive member 48 necessitates an increasing amount of tensioning stroke to maintain a desired working tension.

Various features and advantages of the disclosure are set forth in the following claims.

What is claimed is:

1. An overhead-cam engine cylinder head comprising:
   at least one camshaft support defining an axial direction;
   an axial end face including both a threaded mounting hole and an oil supply port; and
   a hydraulic tensioner having an oil inlet port coupled to the oil supply port, the hydraulic tensioner being secured to the axial end face with a threaded fastener engaged with the threaded mounting hole, the hydraulic tensioner including a rod variably extensible from a body of the hydraulic tensioner, the rod being urged into the body when supplied with oil from the oil supply port.

2. The overhead-cam engine cylinder head of claim 1, wherein the at least one camshaft support includes two camshaft supports for supporting two camshafts about two parallel axes, wherein the threaded mounting hole and the oil supply port are provided between the two camshaft supports.

3. The overhead-cam engine cylinder head of claim 1, further comprising a chamber defined by a plurality of walls adjacent the axial end face, wherein the tensioner does not penetrate any of the plurality of walls.

4. The overhead-cam engine cylinder head of claim 1, wherein a second oil supply port is provided on the axial end face, and a body of the hydraulic tensioner plugs the second oil supply port.

5. The overhead-cam engine cylinder head of claim 1, wherein a second oil supply port is provided on the axial end face, and the tensioner includes a second oil inlet port coupled to the second oil supply port, oil pressure supplied to the tensioner via the second oil inlet port urging the rod to extend from the body, the overhead-cam engine cylinder head further comprising a control valve operable to modulate the oil pressures supplied to the tensioner at the oil inlet port and the second oil inlet port.

6. The overhead-cam engine cylinder head of claim 1, wherein the hydraulic tensioner is fixedly secured at an end opposite the rod.

7. The overhead-cam engine cylinder head of claim 1, wherein the rod has a proximal end positioned within the body and a distal end opposite the proximal end, wherein the distal end has a transverse pin secured thereto.

8. The overhead-cam engine cylinder head of claim 1, further comprising a wear meter, the wear meter including a scale and an indicator coupled to the rod, wherein the indicator is movable along the scale in relation to an available stroke range of the rod.

\* \* \* \* \*